United States Patent
Ahn

(10) Patent No.: US 10,750,102 B2
(45) Date of Patent: Aug. 18, 2020

(54) METHOD OF PROVIDING INTERACTABLE VISUAL OBJECT DURING VIDEO CALL AND SYSTEM PERFORMING METHOD

(71) Applicant: Hyperconnect, Inc., Seoul (KR)

(72) Inventor: Sangil Ahn, Seoul (KR)

(73) Assignee: Hyperconnect, Inc., Seoul (KR)

( * ) Notice: Subject to any disclaimer, the term of this patent is extended or adjusted under 35 U.S.C. 154(b) by 0 days.

(21) Appl. No.: 16/196,442

(22) Filed: Nov. 20, 2018

(65) Prior Publication Data

US 2019/0222775 A1     Jul. 18, 2019

(30) Foreign Application Priority Data

Nov. 21, 2017   (KR) ........................ 10-2017-0155288

(51) Int. Cl.

| | |
|---|---|
| *H04N 7/14* | (2006.01) |
| *H04N 5/272* | (2006.01) |
| *G06K 9/00* | (2006.01) |
| *H04N 5/44* | (2011.01) |
| *H04N 7/15* | (2006.01) |
| *G06F 3/01* | (2006.01) |
| *G06F 3/0488* | (2013.01) |
| *G06F 3/16* | (2006.01) |
| *G06T 7/20* | (2017.01) |
| *H04N 5/445* | (2011.01) |

(52) U.S. Cl.
CPC ......... *H04N 5/272* (2013.01); *G06K 9/00302* (2013.01); *H04N 5/4403* (2013.01); *H04N 7/141* (2013.01); *H04N 7/147* (2013.01); *G06F 3/017* (2013.01); *G06F 3/0488* (2013.01); *G06F 3/167* (2013.01); *G06T 7/20* (2013.01); *G06T 2207/30196* (2013.01); *H04N 5/44591* (2013.01); *H04N 7/15* (2013.01)

(58) Field of Classification Search
CPC ....................................................... H04N 7/14
See application file for complete search history.

(56) References Cited

U.S. PATENT DOCUMENTS

| | | | |
|---|---|---|---|
| 8,373,799 B2 * | 2/2013 | Reponen ................. | G10L 15/26 348/14.08 |
| 8,947,491 B2 * | 2/2015 | Rosenberg ........ | H04M 1/72555 348/14.03 |
| 9,282,287 B1 * | 3/2016 | Marsh .................... | H04N 7/152 |
| 9,445,048 B1 * | 9/2016 | Nariyawala ............. | H04N 7/15 |
| 9,531,998 B1 * | 12/2016 | Farrell .................. | A63F 13/352 |
| 10,044,982 B2 * | 8/2018 | Wilson ................... | H04N 7/157 |
| 10,218,937 B2 | 2/2019 | Wang | |
| 2006/0259552 A1 * | 11/2006 | Mock ................ | H04L 29/06027 709/204 |
| 2013/0141515 A1 * | 6/2013 | Setton .................... | H04N 7/147 348/14.03 |

FOREIGN PATENT DOCUMENTS

| | | |
|---|---|---|
| JP | 2014532330 | 12/2014 |
| WO | 2017084483 | 5/2017 |

* cited by examiner

*Primary Examiner* — Olisa Anwah
(74) *Attorney, Agent, or Firm* — H.C. Park & Associates, PLC

(57) ABSTRACT

A method of providing an interactable visual object capable of being manipulated in terminals on both sides during a video call and a system performing the same.

17 Claims, 11 Drawing Sheets

METHOD OF PROVIDING INTERACTABLE VISUAL OBJECT DURING VIDEO CALL AND SYSTEM PERFORMING METHOD

CROSS REFERENCE TO RELATED APPLICATION

This application claims priority from and the benefit of Korean Patent Application No. 10-2017-0155288, filed on Nov. 21, 2017, which is hereby incorporated by reference for all purposes as if fully set forth herein.

BACKGROUND OF THE INVENTION

Field

Exemplary embodiments of the invention relate to a method of providing an interactable visual object which may be manipulated in terminals on both sides during a video call and a system performing the same.

Discussion of the Background

Recently, as communication technology has advanced and personal devices, such as smartphones and tablet PCs, are widely used, a method for enabling users to easily communicate with each other using such a technology is being widely researched. Representative communication media using the personal devices and the communication technology may include social media and a chatting service.

Consistent with the development of the camera technology and the display technology, most of recent personal devices include a camera module capable of photographing images and video and a high-resolution display. A video chatting service (video call service) suitable for the characteristics of such a high-performance personal device also emerges.

As communication is activated through various media, various schemes for making a user's communication more interested are also proposed. Representative examples of the various schemes may include emoticons and emojis. A user may express his or her feeling or intention by inserting an emoticon during chatting, may attract a counterpart's interest in chatting, and may induce a fun atmosphere.

In chatting that is a representative communication channel, awkwardness may continue when interactive users do not know each other, or do not have acquaintance. Accordingly, chatting is not smoothly performed or a counterpart interactive user may leave a chat room. Accordingly, there is an increasing need to prepare a device (e.g., icebreaker) that obviates tension or awkwardness between interactive users and encourages a pleasant chatting atmosphere. In particular, the icebreaker may be said to be very important in services in which a counterpart interactive user is randomly determined, such as recent random chatting.

The above information disclosed in this Background section is only for understanding of the background of the inventive concepts, and, therefore, it may contain information that does not constitute prior art.

SUMMARY OF THE INVENTION

Exemplary embodiments of the invention provide an interactable visual object, which may be manipulated in a terminal during a video call.

Additional features of the inventive concepts will be set forth in the description which follows, and in part will be apparent from the description, or may be learned by practice of the inventive concepts.

An exemplary embodiment of the invention provides a method of providing an interactable visual object, including the steps of establishing, by a first terminal and a second terminal, a video call session; displaying, by the first terminal, a first video photographed by the second terminal and provided to the first terminal; displaying, by the second terminal, a second video photographed by the first terminal and provided to the second terminal; displaying, by the first terminal, a first appearance of an interactable visual object by overlaying the first appearance on the first video; displaying, by the second terminal, the first appearance of the visual object by overlaying the first appearance on the second video; displaying, by the first terminal, a second appearance of the visual object different from the first appearance of the visual object by overlaying the second appearance on the first video when a first user action caused by a user of the first terminal or a user of the second terminal is detected while the first appearance of the visual object is displayed or after the first appearance is displayed; and displaying, by the second terminal, the second appearance of the visual object by overlaying the second appearance on the second video when the first user action caused by the user of the first terminal or the user of the second terminal is detected.

The second appearance of the visual object displayed on the second terminal may be identical with the second appearance of the visual object displayed on the first terminal.

A computer-readable recording medium may be provided in which a computer program for performing the above-described method is stored.

Another exemplary embodiment of the invention provides a visual object provision system, including a processor and memory storing a computer program, in which the computer program enables the visual object provision system to perform the above-described method when the computer program is executed by the processor.

Another exemplary embodiment of the invention provides a system for providing an interactable visual object, including a selection module configured to select any one of a plurality of interactable visual objects, and a provision module configured to provide a first appearance of the selected visual object to the first terminal and a second terminal performing a video call with the first terminal. The first terminal displays a first video photographed by the second terminal and provided to the first terminal, displays the first appearance of the visual object by overlaying the first appearance on the first video. The second terminal displays a second video photographed by the first terminal and provided to the second terminal, and displays the first appearance of the visual object by overlaying the first appearance on the second video. The provision module provides a second appearance of the visual object different from the first appearance of the visual object to the first terminal and the second terminal, when a first user action caused by the user of the first terminal or the user of the second terminal is detected while the first appearance of the visual object is displayed or after the first appearance is displayed. The first terminal displays the second appearance of the visual object by overlaying the second appearance on the first video. The second terminal displays the second appearance of the visual object by overlaying the second appearance on the second video.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
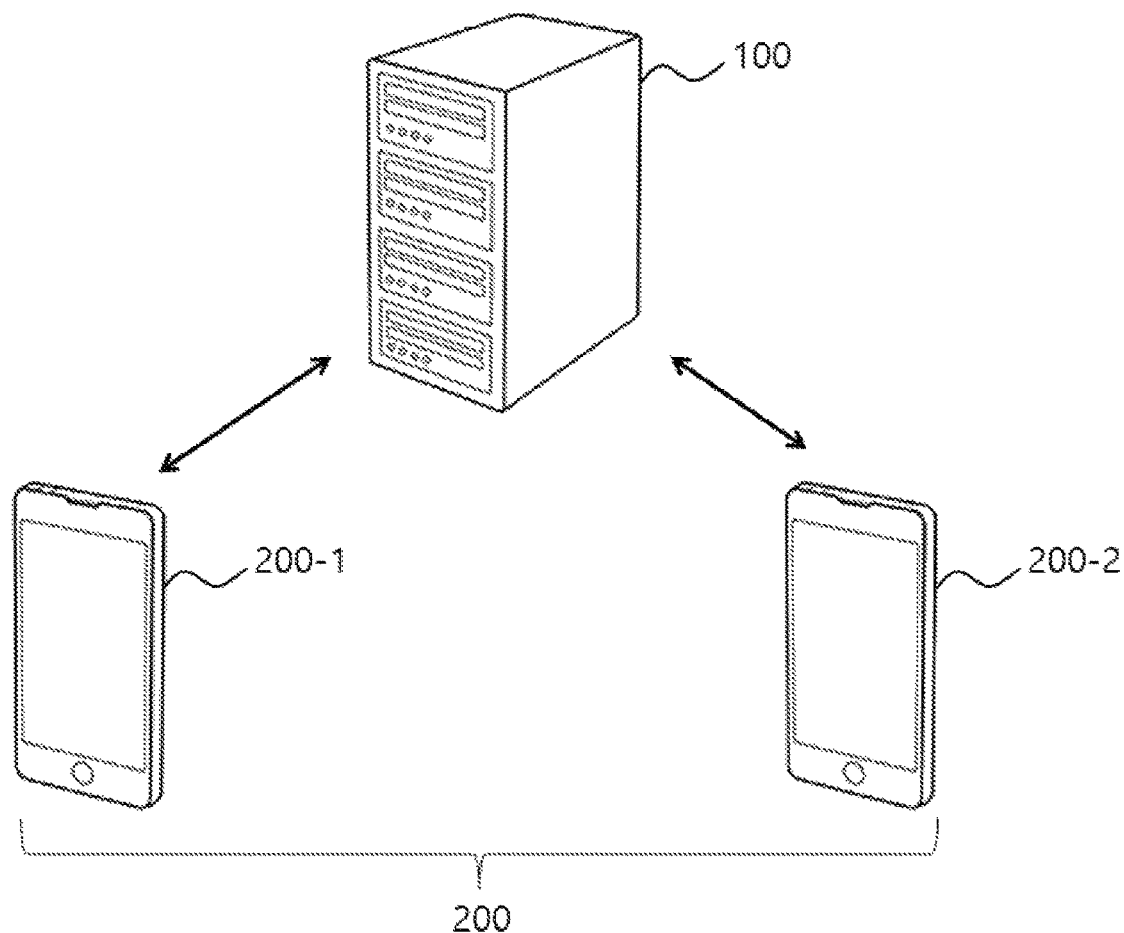
FIG. 1 is a diagram for schematically illustrating an environment in which a method of providing an interactable visual object according to an exemplary embodiment of the invention is executed.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

When an exemplary embodiment may be implemented differently, a specific process order may be performed differently from the described order. For example, two consecutively described processes may be performed substantially at the same time or performed in an order opposite to the described order. Also, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, one or more components may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, one or more components may include or otherwise be associated with one or more memories (not shown) including code (e.g., instructions) configured to cause the one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The terms used in this application are used to describe specific embodiments only and are not intended to restrict the scope of right. An expression of the singular number includes an expression of the plural number unless clearly defined otherwise in the context.

In this application, it is to be understood that a term, such as "include" or "have", is intended to designate that a characteristic, number, step, operation, element, part or a combination of them described in the specification is present, and does not exclude the presence or addition possibility of one or more other characteristics, numbers, steps, operations, elements, parts, or combinations of them in advance.

Furthermore, in this specification, if one element "transmits" data to the other element, this means that one element may directly transmit the data to the other element or may transmit the data to the other element through at least another element. In contrast, if one element "directly transmit" data to the other element, this means that the data is transmitted from one element to the other element without the intervention of another element.

Hereinafter, the present invention is described in detail based on exemplary embodiments of the invention with reference to the accompanying drawings. The same reference numerals described in drawings refer to the same elements.

FIG. 1 is a diagram for schematically illustrating an environment in which a method of providing an interactable visual object (hereinafter referred to as a "visual object provision method") according to an exemplary embodiment of the invention is executed.

Referring to FIG. 1, in order to implement the visual object provision method, a system 100 for providing an interactable visual object (hereinafter referred to as a "visual object provision system") and a terminal 200 may be provided.

The terminal 200 is connected to the visual object provision system 100 over a communication network, and may transmit and receive various types of information, data and/or signals necessary to implement the inventive concepts. FIG. 1 illustrates only two terminals 200-1 and 200-2, for convenience of description, but a greater number of terminals may be connected to the visual object provision system 100. Furthermore, if necessary, the terminals 200 may also communicate with each other, and may transmit and receive various types of information, data and/or signals necessary to implement the technical spirit of the inventive concepts.

The visual object provision system 100 may be a server.

The terminal 200 may be an information processing device having a network communication function. For example, the terminal 200 may be a processing device including a handheld device, such as a desktop computer, a laptop computer, a mobile phone, a satellite phone, a wireless phone, a session initiation protocol (SIP), a wireless local loop (WLL) station, a smartphone, a tablet PC, or a personal digital assistant (PDA).

The visual object provision system 100 may provide an interactable visual object to the terminal 200. The terminal 200 may display the provided visual object.

Hereinafter, a visual object may mean an object visually represented through a display device included in the terminal 200. For example, the visual object may be called an emoticon, an emoji, a sticker, or an acticon.

One visual object may have two different appearances. Furthermore, each appearance of the visual object may be represented in various forms. For example, each appearance of the visual object may be a single image, a dynamic image that is played back once or a dynamic image that is repeatedly played back, or a combination of the single and dynamic images.

The appearance of the visual object may be changed through an interaction with a user. For example, after the first appearance of a visual object is displayed on the terminal 200, or while the first appearance of the visual object is displayed on the terminal 200, when a user takes a previously designated action, the terminal 200 may display the second appearance of the visual object instead of the first appearance of the visual object.

The user action is caused by a user, and may mean a user's action that may be detected through various input devices (e.g., a touch screen, a gyro sensor, an acceleration sensor, a microphone, or a camera) included in the terminal 200. For example, a user action may include a touch gesture input through a touch screen, a motion of a terminal itself detected through a gyro sensor and/or an acceleration sensor, a user's voice/sound input through a microphone, or a contactless motion gesture detected through a camera.

All behaviors caused by a user are not user actions. A behavior caused by a user may be treated as a user action capable of changing the appearance of a visual object only when the behavior satisfies a specific criterion.

Figure 2:
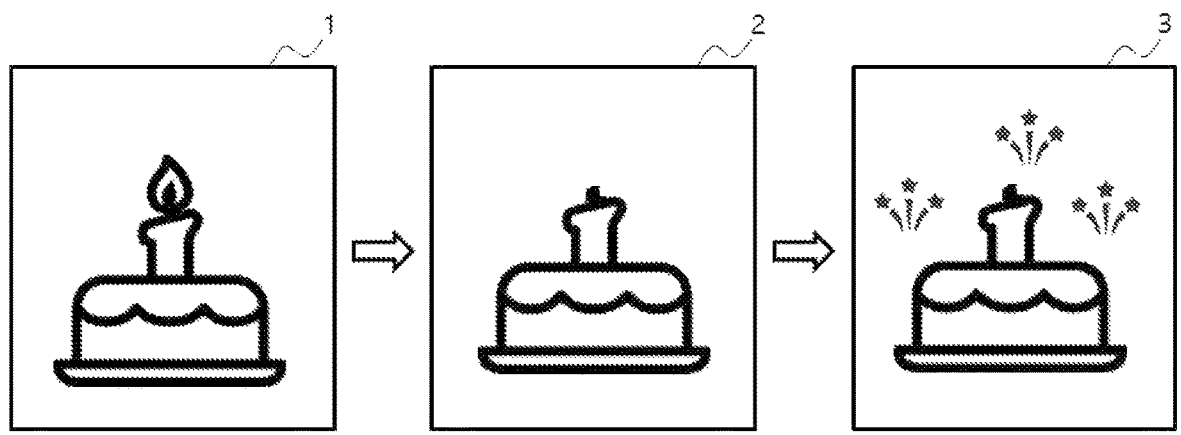
FIG. 2 is a diagram illustrating an example in which the appearance of a visual object is changed by an interaction with a user according to an exemplary embodiment of the invention.

FIG. 2 is a diagram illustrating an example in which the appearance of a visual object is changed by an interaction with a user according to an exemplary embodiment of the invention. Referring to FIG. 2, the first appearance 1 of a visual object may be displayed on the terminal 200. The first appearance 1 of the visual object may be a form of an image of a cake in which a candle has been stuck or a form of a dynamic image in which a candle stuck in a cake rises.

After the first appearance 1 of the visual object is displayed or while it is displayed, when a previously-designated first user action is detected (e.g., when a user touches an area on a touch screen on which a flame portion is displayed or makes a gesture to blow out the candle), the second appearance 2 of the visual object instead of the first appearance 1 of the visual object may be displayed on the terminal 200. The second appearance 2 of the visual object may take the form of an image of a cake in which an extinguished candle has been stuck or a form of a dynamic image that represents that smoke rises from a candle stuck in a cake.

During or after display of the second appearance 2 of the visual object, when a previously designated second user action is detected (e.g., when a user touches a touch screen of a flame portion by a predetermined number of times or more for a given time or makes a gesture of applauding), the third appearance 3 of the visual object instead of the second appearance 2 of the visual object may be displayed on the terminal 200. The third appearance 3 of the visual object may be a form of an image to which firecrackers have been added, or a form of a dynamic image that represents that firecrackers go off.

Referring back to FIG. 1, the visual object provision system 100 may be a sub-system of a mother system that provides a given Internet service. That is, the visual object provision system 100 may be part of a mother system.

In an exemplary embodiment, the mother system may be a system providing video call service, but the inventive concepts are not limited thereto. The mother system may be a system providing various types of webs/Internet services, including a text chatting service and a voice chatting service.

A video call is a means that enables at least two users to talk with each other through video, and may be referred to as videotelephony, video chatting, or a video conference.

For example, if the mother system is a system providing a video call service, the mother system may relay two terminals (e.g., 200-1 and 200-2) that belong to a plurality of terminals and that want to perform a video call each other. The first terminal 200-1 and the second terminal 200-2 that perform a video call may establish a session for the video call. Furthermore, each of the first terminal 200-1 and the second terminal 200-2 may photograph a user through its camera modules, may provide the captured images to a counterpart terminal, and may display an image of a counterpart received from the counterpart terminal. A given application for a video call may be installed on a terminal that performs a video call.

Figure 3:
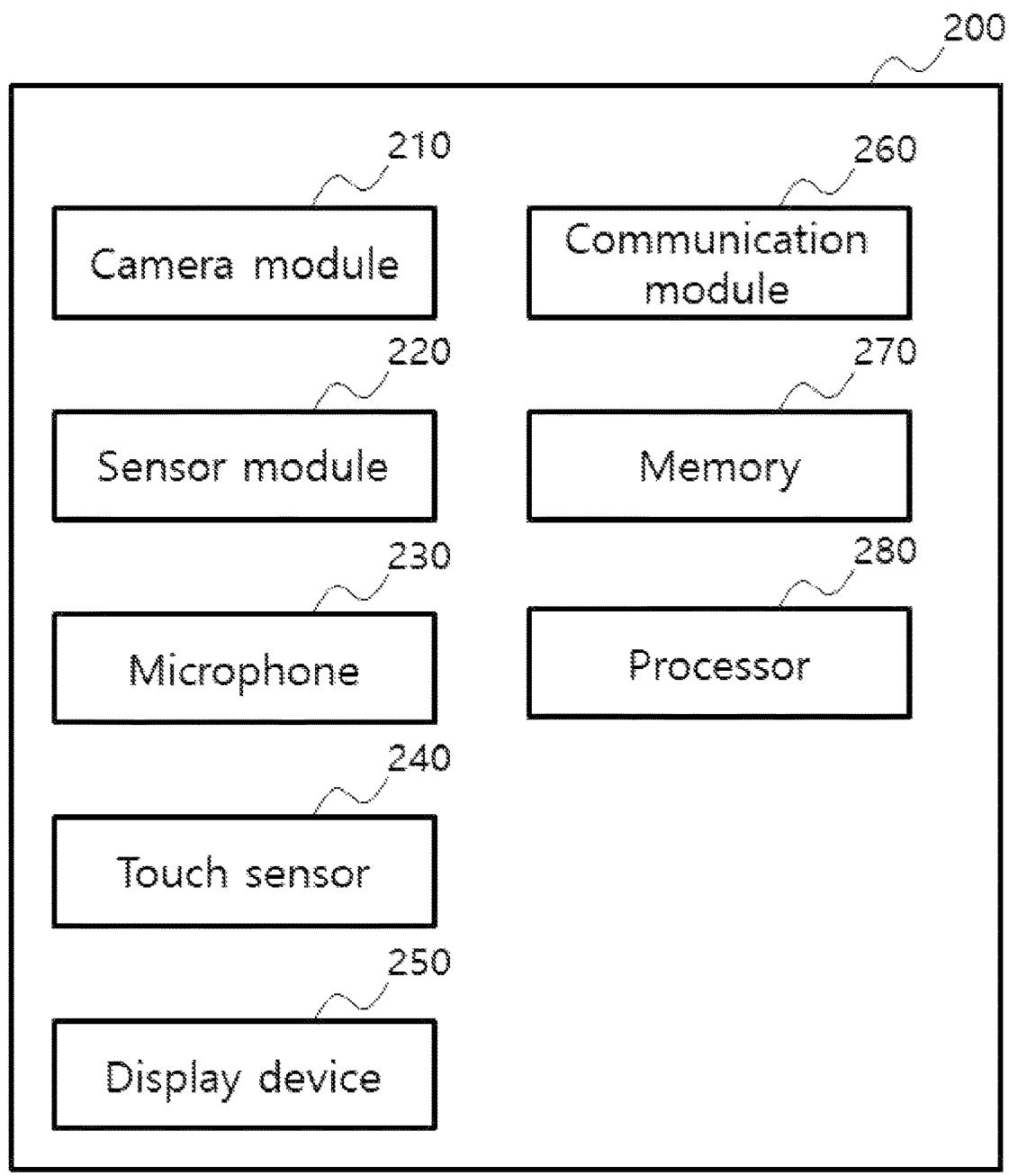
FIG. 3 is a block diagram schematically showing the configuration of a terminal according to an exemplary embodiment of the invention.

FIG. 3 is a block diagram schematically showing the configuration of the terminal 200 according to an exemplary embodiment of the invention.

Referring to FIG. 3, the terminal 200 may include a camera module 210, a sensor module 220, a microphone 230, a touch sensor 240, a display device 250, a communication module 260, memory 270, and a processor 280. In some exemplary embodiments of the invention, some of the above-described elements may not correspond to an element essentially necessary for an implementation of the present invention. Furthermore, the terminal 200 may include more elements in some exemplary embodiments.

The camera module 210 may change an image received through its lens, into a digital signal, and may be used to capture a photo or a moving image. The camera module 210 may include an image sensor, such as a charge coupled device (CCD) sensor or a complementary metal oxide semi-conductor (CMOS) sensor, a lens, or an infrared filter.

The sensor module 220 may detect a specific physical quantity or a specific type of energy. The sensor module 220 may include an acceleration sensor, a gyro sensor, an illumination sensor, a proximity sensor, a magnetic sensor, a pressure sensor, or a photo sensor.

The microphone 230 may be a device capable of receiving a sound signal and converting sound waves into an electrical signal.

The touch sensor 240 may be a sensor for detecting a touch through a user's finger or a given touch device (e.g., stylus). The touch sensor 240 may include an impact type touch panel, a resistive film type touch panel, or a capacitive type touch panel, for example.

The display device 250 is a device capable of outputting visual information, and may include a liquid crystals display (LCD), a light-emitting diode display (LED), a plasma display (PDP), an organic light-emitting diode display (OLED), or a surface conductive electron emitter display (SED).

In an exemplary embodiment, the touch sensor 240 and the display device 250 may be implemented in the form of a touch screen.

The communication module 260 performs communication with an external device, and may transmit and receive various signals, information, and data. The communication module 260 may include long-distance communication modules, such as a 3G module, an LTE module, an LTE-A module, a Wi-Fi module, a WiGig module, an ultra wide band (UWB) module, or a LAN card, or short-distance communication modules, such as an MST module, a Bluetooth module, an NFC module, an RFID module, a ZigBee module, a Z-Wave module, or an IR module.

The memory 270 may store various data, such as data received/input from an external device and data generated by the terminal 200, and a computer program. The memory 270 may include volatile memory and non-volatile memory. The memory 270 may include flash memory, ROM, RAM, EEROM, EPROM, EEPROM, a hard disk and a register, for example. Alternatively, the memory 270 may include a file system, a database, or an embedded database.

The processor 280 is connected to other elements (e.g., the camera module 210, the sensor module 220, the microphone 230, the touch sensor 240, the display device 250, the communication module 260 and the memory 270) included in the terminal 200, and may control the functions and/or resources of the elements. Furthermore, the processor 280 may control the terminal 200 to perform a visual object provision method to be described later. The processor 280 may include a CPU, a GPU, an MCU, and/or a microprocessor.

Figure 4:
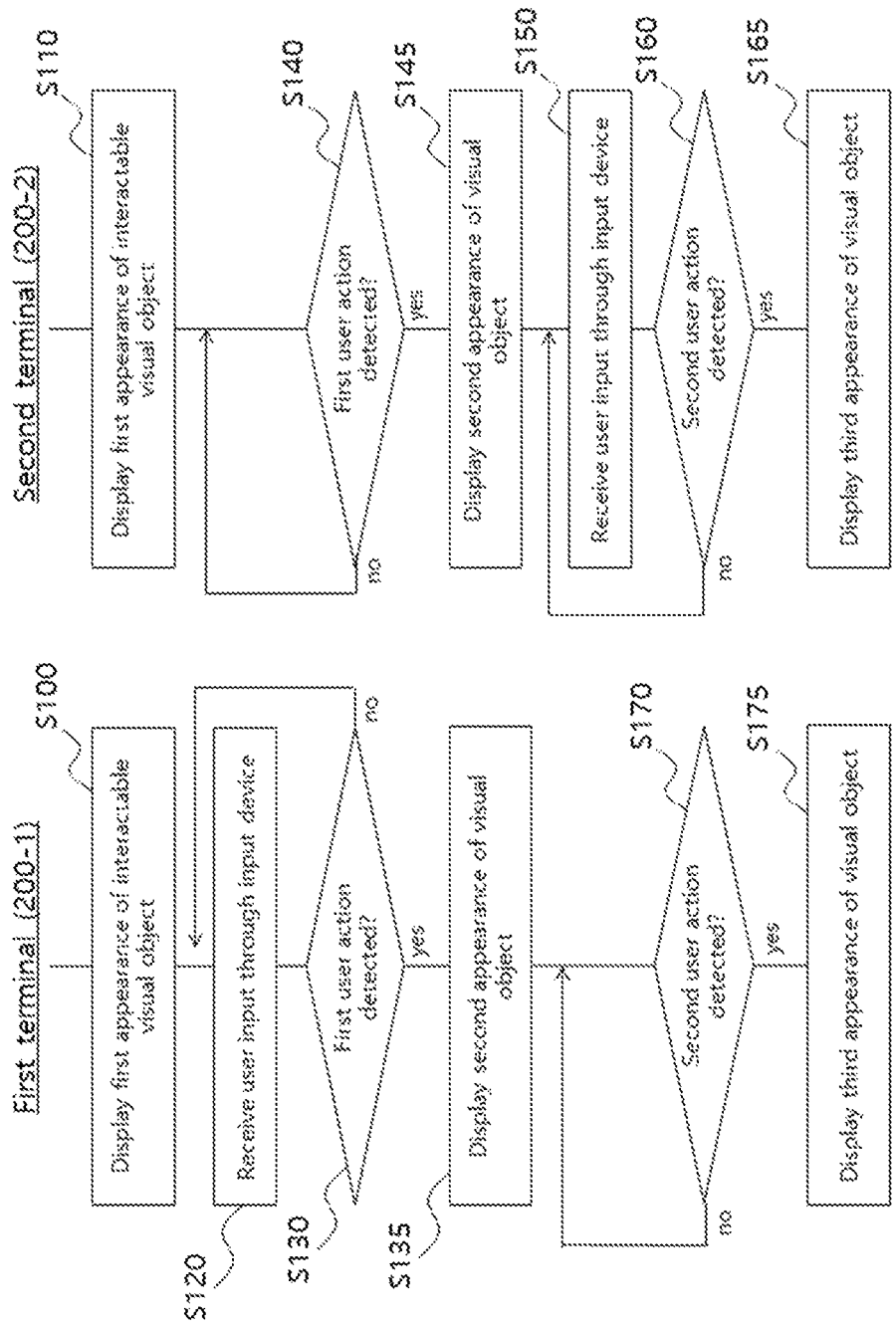
FIG. 4 is a flowchart illustrating a method of providing an interactable visual object according to an exemplary embodiment of the invention.

FIG. 4 is a flowchart illustrating an interactable visual object provision method an according to an exemplary embodiment of the invention.

Referring to FIG. 4, each of the first terminal 200-1 and the second terminal 200-2 may display the first appearance of an interactable visual object (S100, S110).

After the first appearance of the visual object is displayed or while it is displayed, the first terminal 200-1 may receive a user input through a given input device of the first terminal 200-1 (S120).

If the user input received by the first terminal 200-1 is a previously designated first user action, the first terminal 200-1 or an external system (e.g., the visual object provision system 100) communicating with the first terminal 200-1 may detect the first user action caused by a user corresponding to the first terminal 200-1.

When the first user action is detected (S130), the first terminal 200-1 may display the second appearance of the visual object (S135).

When the first user action caused by the user of the first terminal 200-1 is detected (S140), the second terminal 200-2 may display the second appearance of the visual object (S145).

In some exemplary embodiments, unlike in FIG. 4, the previously designated first user action may be caused by the user of the second terminal 200-2. If this occurs, the first terminal 200-1 and the second terminal 200-2 may display the second appearance of the visual object instead of the first appearance of the visual object. In some exemplary embodiments, the second appearance of the visual object displayed by the first terminal and second terminal when the first user action caused by the user of the first terminal is detected and the second appearance of the visual object displayed by the first terminal and second terminal when the first user action caused by the user of the second terminal is detected may be different or the same.

Referring to FIG. 4, after the second appearance of the visual object is displayed or while it is displayed, the second terminal 200-2 may receive a user input through a given input device of the second terminal 200-1 (S150).

If the user input received by the second terminal 200-2 is a previously designated second user action, the second terminal 200-2 or an external system (e.g., the visual object provision system 100) communicating with the second terminal 200-2 may detect the second user action caused by a user corresponding to the second terminal 200-2.

When the second user action is detected (S160), the second terminal 200-2 may display the third appearance of the visual object (S165).

When the second user action caused by the user of the second terminal 200-2 is detected (S170), the first terminal 200-1 may also display the third appearance of the visual object (S175).

In some exemplary embodiments, unlike in FIG. 4, the previously designated second user action may be caused by the user of the first terminal 200-1. If this occurs, the first terminal 200-1 and the second terminal 200-2 may display the third appearance of the visual object instead of the second appearance of the visual object. In some exemplary embodiments, the third appearance of the visual object displayed by the first terminal and the second terminal when the second user action caused by the user of the first terminal is detected and the third appearance of the visual object displayed by the first terminal and the second terminal when the second user action caused by the user of the second terminal is detected may be different or the same.

Furthermore, FIG. 4 shows an example regarding a visual object that may take three appearances, but the inventive concepts are not limited thereto. A visual object capable of taking a greater number of appearances may be present.

The number of second appearances that may be changed from the first appearance of the visual object may be one or more. That is, the second appearance of the visual object may be any one of predefined two or more selectable appearances. The selectable appearance may mean a candidate appearance that may become the second appearance.

In this case, the second appearance may be determined in response to a user action. The number of user actions capable of changing the visual object from the first appearance to the second appearance may be more than one. Each of the user actions may correspond to any one of the predefined two or more selectable appearances. Information about each user action and a selectable appearance corresponding to each user action may have been previously stored in the terminal 200 and/or the visual object provision system 100.

Hereinafter, an exemplary embodiment in which multiple selectable appearances are included is described with reference to FIG. 5.

Figure 5:
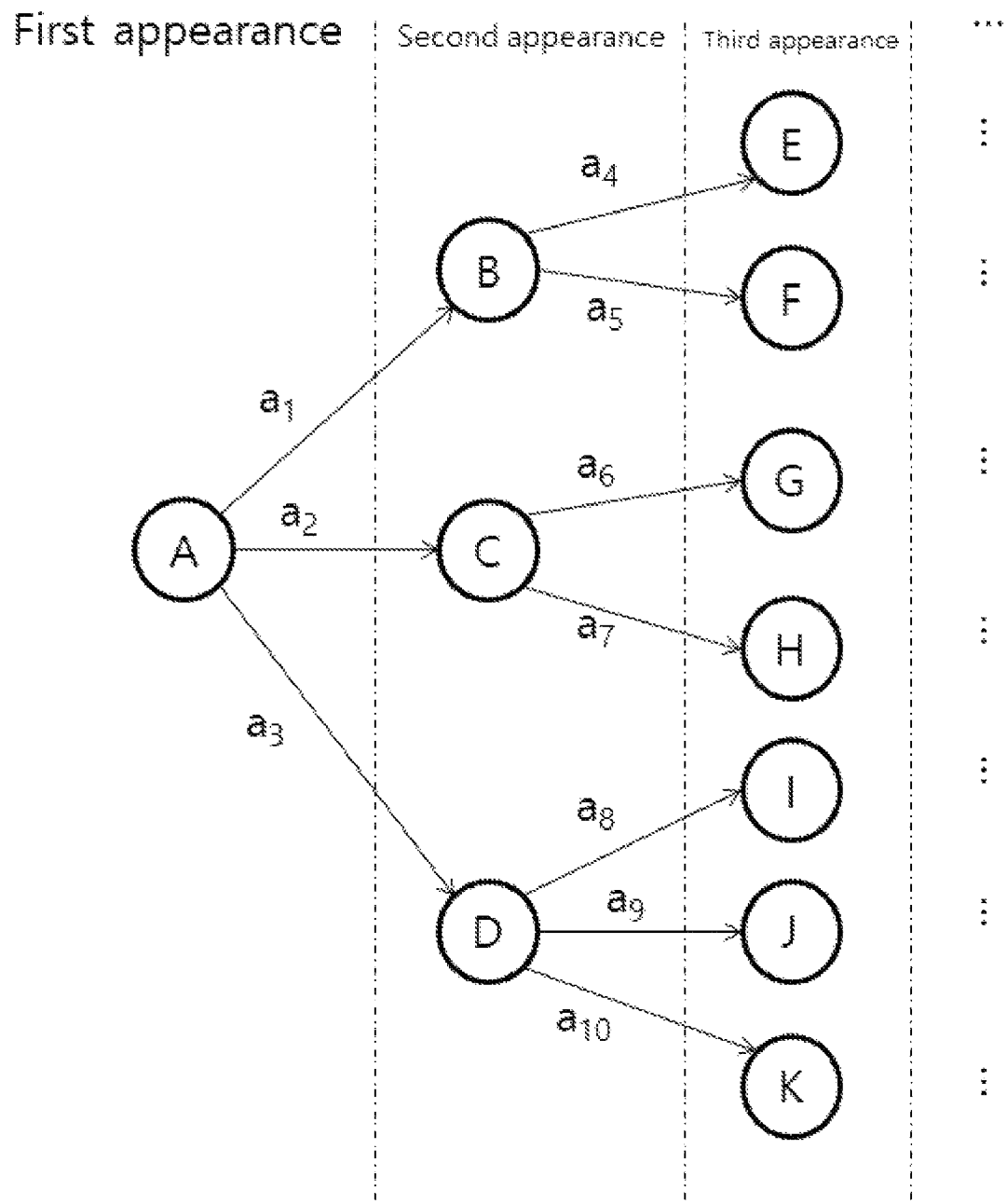
FIG. 5 is a diagram for illustrating an exemplary embodiment in which multiple selectable appearances are present.

In the graph of FIG. 5, a node means an appearance that may be taken by a visual object, and a main line means a user action for a change in the appearance. The first appearance of a visual object in FIG. 5 is represented as a node A.

Referring to FIG. 5, selectable appearances that may be changed from the first appearance of the visual object may be nodes B, C, and D. When a user action $a_1$ is detected in the state in which the first appearance of the visual object has been displayed, the node B may be a second appearance of the visual object. When a user action $a_2$ is detected, the node C may become a second appearance of the visual object. When a user action $a_3$ is detected, the node D may become a second appearance of the visual object.

In the state in which the node B has been displayed as the second appearance, nodes E and F may be selectable appearances. When a user action $a_4$ is detected, the node E may be a third appearance of the visual object. When a user action $a_5$ is detected, the node F may be a third appearance of the visual object.

A person having ordinary knowledge in the field to which the invention belongs may sufficiently understand the meaning of a node and main node that have not been described based on the above description. Furthermore, FIG. 5 illustrates an example in which an appearance is changed up to the third appearance for convenience of description, but the appearance may be extended to a fourth appearance, a fifth appearance, and so on.

The first terminal 200-1 and the second terminal 200-2 may execute their video call applications so that corresponding users can perform a video call, and may display visual objects on the video call applications. A detailed embodiment of such an operation is described below with reference to FIGS. 6*a* and 6*b*. It is hereinafter assumed that a user of the first terminal 200-1 is a user A and a user of the second terminal 200-2 is a user B.

Figure 6A:
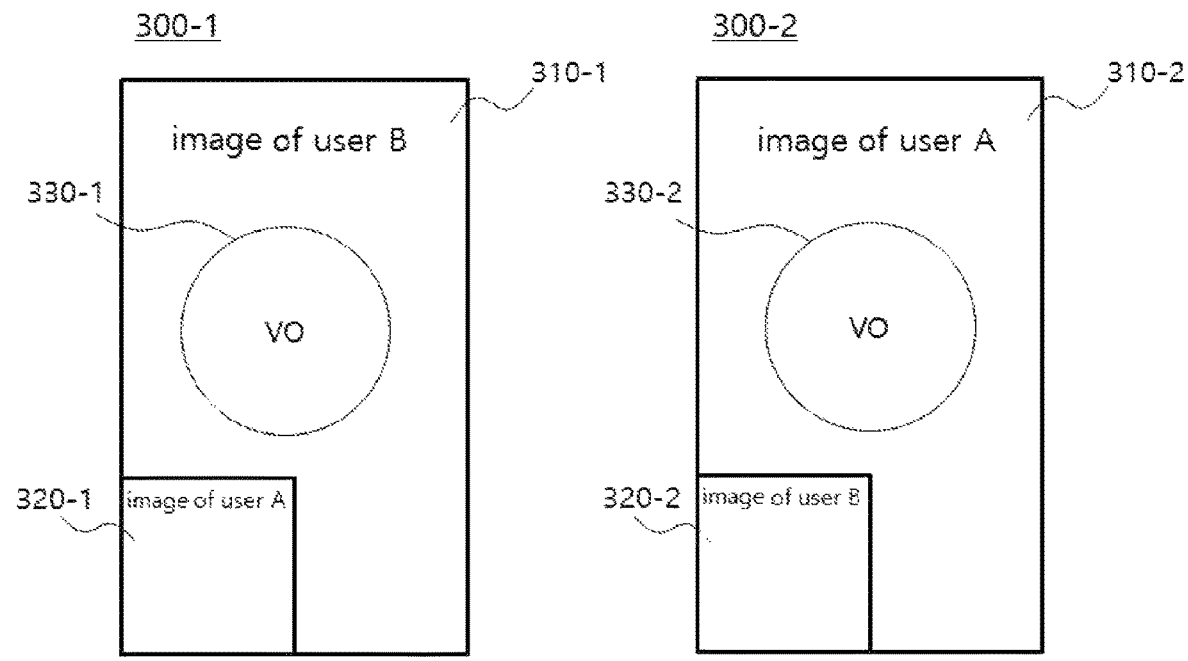
FIG. 6A and FIG. 6B are diagrams for illustrating an example in which a visual object is overlaid on a video call screen according to an exemplary embodiment of the invention.
Figure 6B:
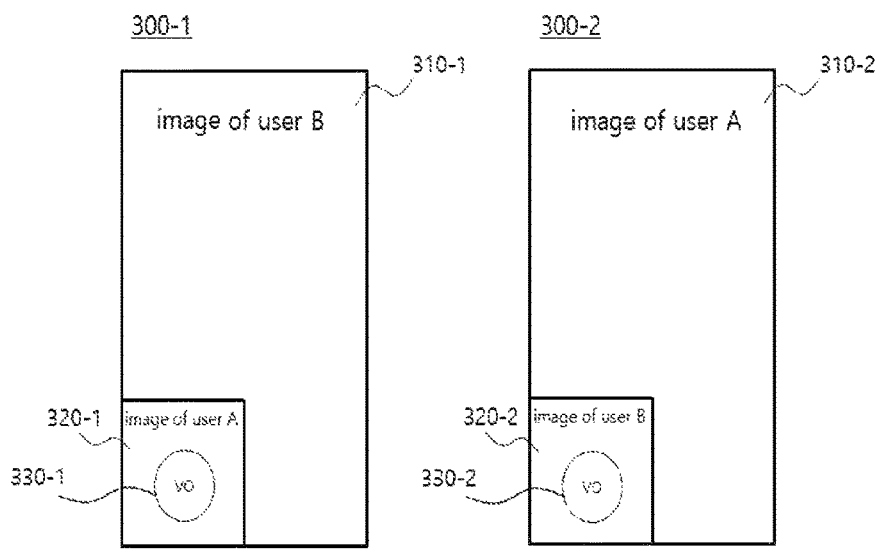

Referring to FIGS. 6A and 6B, the second terminal 200-2 may capture an image of the user B through its camera module and provide the captured image to the first terminal 200-1. A first image 310-1 (i.e., the image of the user B) captured by the second terminal 200-2 and provided to the first terminal 200-1 may be displayed on a video call screen 300-1 of the first terminal 200-1.

The first terminal 200-1 may capture an image of the user A through its camera module and provide the captured image to the second terminal 200-2. A second image 310-2 (i.e., the image of the user A) captured by the first terminal 200-1 and provided to the second terminal 200-2 may be displayed on a video call screen 300-2 of the second terminal 200-2.

In some exemplary embodiments, an image 320-1 of the user A, that is, a photographed image of the user A of the first terminal 200-1, may be further displayed on the video call screen 300-1 of the first terminal 200-1. An image 320-2 of the user B, that is, a photographed image of the user B of the second terminal 200-2, may be further displayed on the video call screen 300-2 of the second terminal 200-2.

In the exemplary embodiment of FIG. 6A, the first terminal 200-1 may display the first appearance and second appearance of a visual object 330-1 by overlaying them on the first image 310-1. Furthermore, the second terminal 200-2 may display the first appearance and second appearance of a visual object 330-2 by overlaying them on the second image 310-2.

In contrast, in the exemplary embodiment of FIG. 6B, unlike in the exemplary embodiment of FIG. 6A, the first terminal 200-1 may display the first appearance and second appearance of the visual object 330-1 by overlaying them on the photographed image 320-1. The second terminal 200-2 may display the first appearance and second appearance of the visual object 330-2 by overlaying them on the photographed image 320-2.

Figure 7:
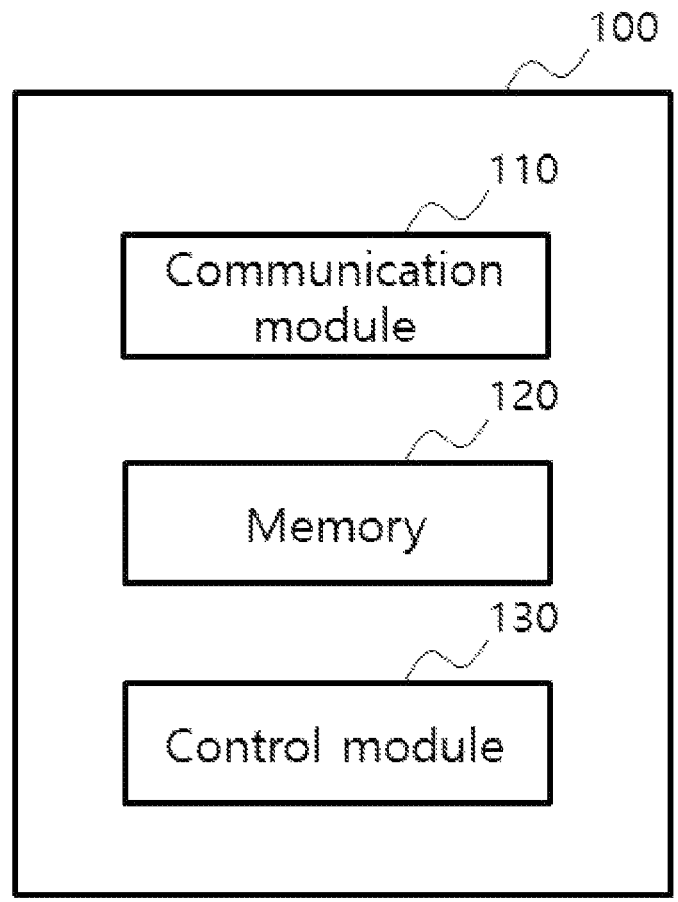
FIG. 7 and FIG. 8 are block diagrams schematically showing the configuration of a system for providing an interactable visual object according to an exemplary embodiment of the invention.

FIG. 7 is a block diagram schematically showing the configuration of the visual object provision system 100 according to an exemplary embodiment of the invention.

Referring to FIG. 7, the visual object provision system 100 may include a communication module 110, memory 120, and a control module 130. In some exemplary embodiments of the invention, some of the above-described elements may not correspond to an element essentially necessary for an implementation of the invention. Furthermore, the visual object provision system 100 may include more elements according to exemplary embodiments.

The visual object provision system 100 may include a hardware resource and/or software necessary to implement the technical spirit of the present invention, and it does not essentially mean a single physical element or a single device. That is, the visual object provision system 100 may mean a logical combination of hardware and/or software provided to implement the technical spirit of the present invention. In some exemplary embodiments, the visual object provision system 100 may be implemented as a set of logical elements that are disposed in respective devices to implement the technical spirit of the present invention by performing their functions. Furthermore, the visual object provision system 100 may mean a set of elements separately implemented for each function or role for implementing the technical spirit of the present invention. Furthermore, in this specification, the module may mean a functional and/or structural combination of hardware for performing the technical spirit of the present invention and software for driving the hardware. For example, a person having ordinary skill in the art to which the present invention pertains will easily reason that the module may mean a logical unit of a given code and a hardware resource in which the given code is executed, and does not essentially means a physically connected code or one type of hardware.

Referring to FIG. 7, the communication module 110 performs communication with an external device, and may transmit and receive various signals, information and data. For example, the communication module 110 performs communication with the terminal 200, and may transmit information about an interactable visual object. The communication module 110 may include long-distance communication modules, such as a 3G module, an LTE module, an LTE-A module, a Wi-Fi module, a WiGig module, an ultra wide band (UWB) module, or an LAN card, or short-distance communication modules, such as an MST module, a Bluetooth module, an NFC module, an RFID module, a ZigBee module, a Z-Wave module, or an IR module.

The memory 120 may store various data, such as data received/input from an external device and data generated by the terminal 200, and a computer program. For example, the memory 120 may store information about one or more interactable visual objects, profile information (e.g., date of birth, age, sex, nationality, address, access place and an area of interest) previously input by a user, and so on. The memory 120 may include volatile memory and non-volatile memory. The memory 120 may include flash memory, ROM, RAM, EEROM, EPROM, EEPROM, a hard disk and a register, for example. Alternatively, the memory 270 may include a file system, a database, or an embedded database.

The control module 130 is connected to other elements (e.g., the communication module 110 and the memory 120) included in the visual object provision system 100, and may control the functions and/or resources of the elements. Furthermore, the control module 130 may control the visual object provision system 100 to perform a visual object provision method to be described later. The control module 130 may include a processor, such as a CPU, a GPU, an MCU, and/or a microprocessor.

Figure 8:
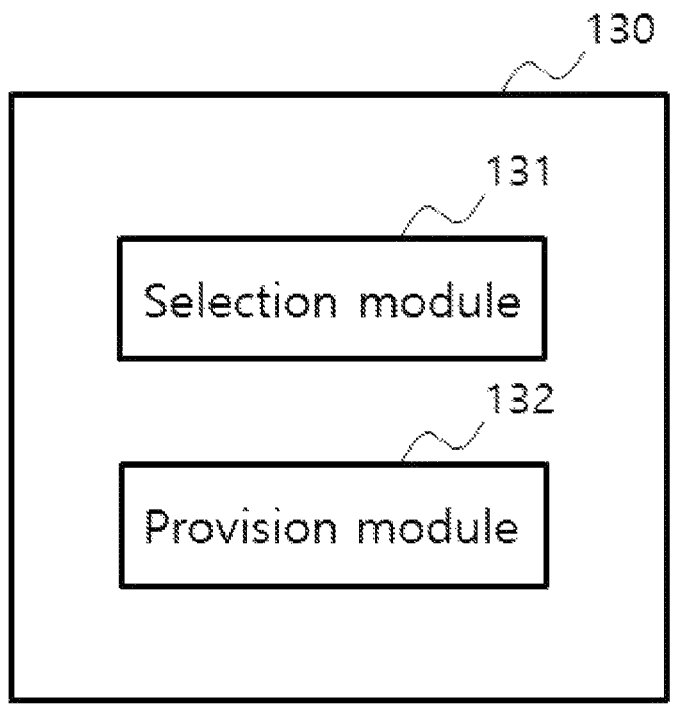

FIG. 8 is a block diagram showing the detailed configuration of the control module 130 of the visual object provision system 100. Referring to FIG. 8, the control module 130 may include a selection module 131 and a provision module 132.

The selection module 131 may select any one of a plurality of interactable visual objects as a visual object to be provided to the terminal 200.

There may be various methods for the selection module 131 to select a visual object.

In an exemplary embodiment, the selection module 131 may randomly select any one of a plurality of previously stored visual objects.

In another exemplary embodiment, the selection module 131 may select a visual object selected by a user. For example, the selection module 131 may provide a list of a plurality of visual objects previously stored in the first terminal 200-1 or the second terminal 200-2 communicating with the first terminal 200-1. The user of the first terminal 200-1 or the user of the second terminal 200-2 may select any one visual object in the list.

In another exemplary embodiment, the selection module 131 may select a visual object based on user information. More specifically, a user may previously resister his or her profile information (e.g., date of birth, age, sex, nationality, address and an area of interest) with the visual object provision system 100. The selection module 131 may select a visual object based on various types of user information (e.g., access place) including the profile information of the user.

In some exemplary embodiments, the selection module 131 may use only information about the user of any one of the first terminal 200-1 and the second terminal 200-2, or may use information about both the users of the first terminal 200-1 and the second terminal 200-2.

The selection module 131 may analyze an image photographed by the first terminal 200-1 and/or an image photographed by the second terminal 200-2, and may use a result of the analysis to select a visual object. For example, the selection module 131 may determine a user's expression or gesture by analyzing an image photographed by the terminal 200-1 or 200-2, and may use a result of the determination to select a visual object.

In addition, the selection module 131 may select a visual object by further considering information, such as the time/date when the visual object is determined and the current location of a user.

The provision module 132 may provide the terminal 200 with a visual object determined by the selection module 131.

In an exemplary embodiment, the provision module 132 may individually provide the terminal 200 with information about a specific appearance of a visual object whenever the information is necessary.

More specifically, the provision module 132 may first provide the first appearance of the visual object to the first terminal 200-1 and the second terminal 200-2. While the first appearance of the visual object is displayed on the terminals 200-1 and 200-2 or after it is displayed, when a first user action caused by a user is detected, the provision module 132 may further provide the second appearance of the visual object to the first terminal 200-1 and the second terminal 200-2. Furthermore, while the second appearance of the visual object is displayed on the terminals 200-1 and 200-2 or after it is displayed, when a second user action caused by the user is detected, the provision module 132 may further provide the third appearance of the visual object to the first terminal 200-1 and the second terminal 200-2.

In another exemplary embodiment, the provision module 132 may provide package information, including information about all of appearances that may be taken by a visual object, to the terminal 200. For example, if a visual object determined by the selection module 131 can take a first appearance to a third appearance, the provision module 132 may provide the terminal 200 with package information, including information about the first appearance of the visual object, information about the second appearance of the visual object and information about the third appearance of the visual object. Accordingly, the terminal 200 may extract information about a specific appearance to be displayed from the provided package information, and may display the specific appearance of the visual object based on the extracted information.

Figure 9:
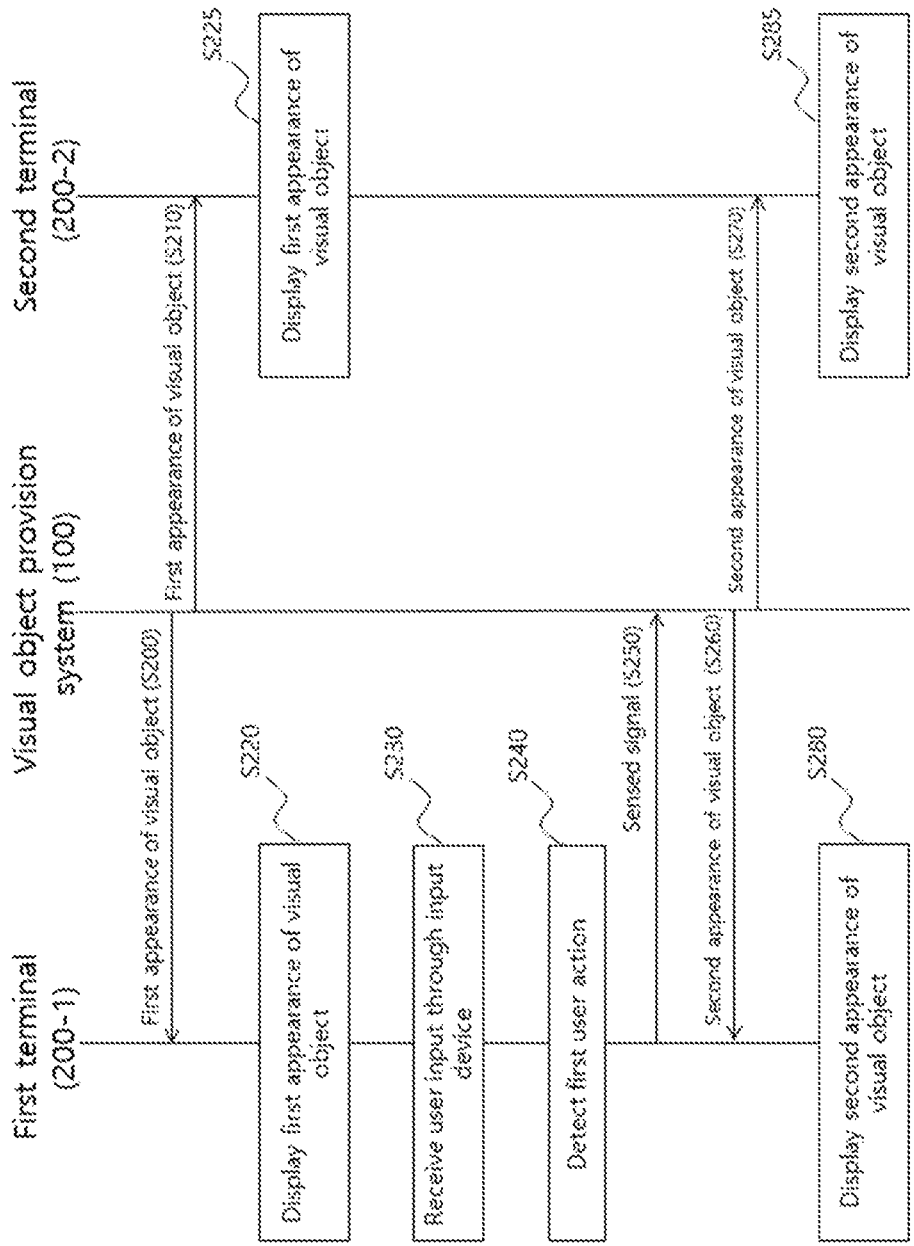
FIG. 9, FIG. 10, FIG. 11, and FIG. 12 are flowcharts illustrating a method of providing an interactable visual object according to an exemplary embodiment of the invention.

FIG. 9 is a flowchart illustrating a visual object provision method according to an exemplary embodiment of the invention.

Referring to FIG. 9, the visual object provision system 100 may provide the first appearance of a visual object to the first terminal 200-1 and the second terminal 200-2 (S200, S210). To this end, the visual object provision system 100 may transmit information about the first appearance of the visual object to the first terminal 200-1 and the second terminal 200-2.

In response thereto, the first terminal 200-1 and the second terminal 200-2 may display the first appearance of the visual object (S220, S225).

While the first appearance of the visual object is displayed or after it is displayed, the first terminal 200-1 may receive a user input through an input device (S230). Furthermore, the first terminal 200-1 may detect whether the user input received through the input device is a previously designated first user action (S240).

For example, if the first user action has been defined as a touch gesture of a given pattern, the first terminal 200-1 may detect the touch input of the user received through a touch panel or a touch screen, and may determine whether the received touch input is a previously defined first user action (that is, a touch input of a given pattern).

When the first user action caused by the user of the first terminal 200-1 is detected, the first terminal 200-1 may transmit a given sensed signal to the visual object provision system 100 (S260). The sensed signal may be a signal that the first terminal 200-1 provides notification of the detection of the first user action or a signal that the first terminal 200-1 requests the second appearance of the visual object.

In response to the sensed signal, the visual object provision system 100 may provide the second appearance of the visual object to the first terminal 200-1 and the second terminal 200-2 (S260, S270).

In response thereto, the first terminal 200-1 and the second terminal 200-2 may display the second appearance of the visual object (S280, S285).

Figure 10:
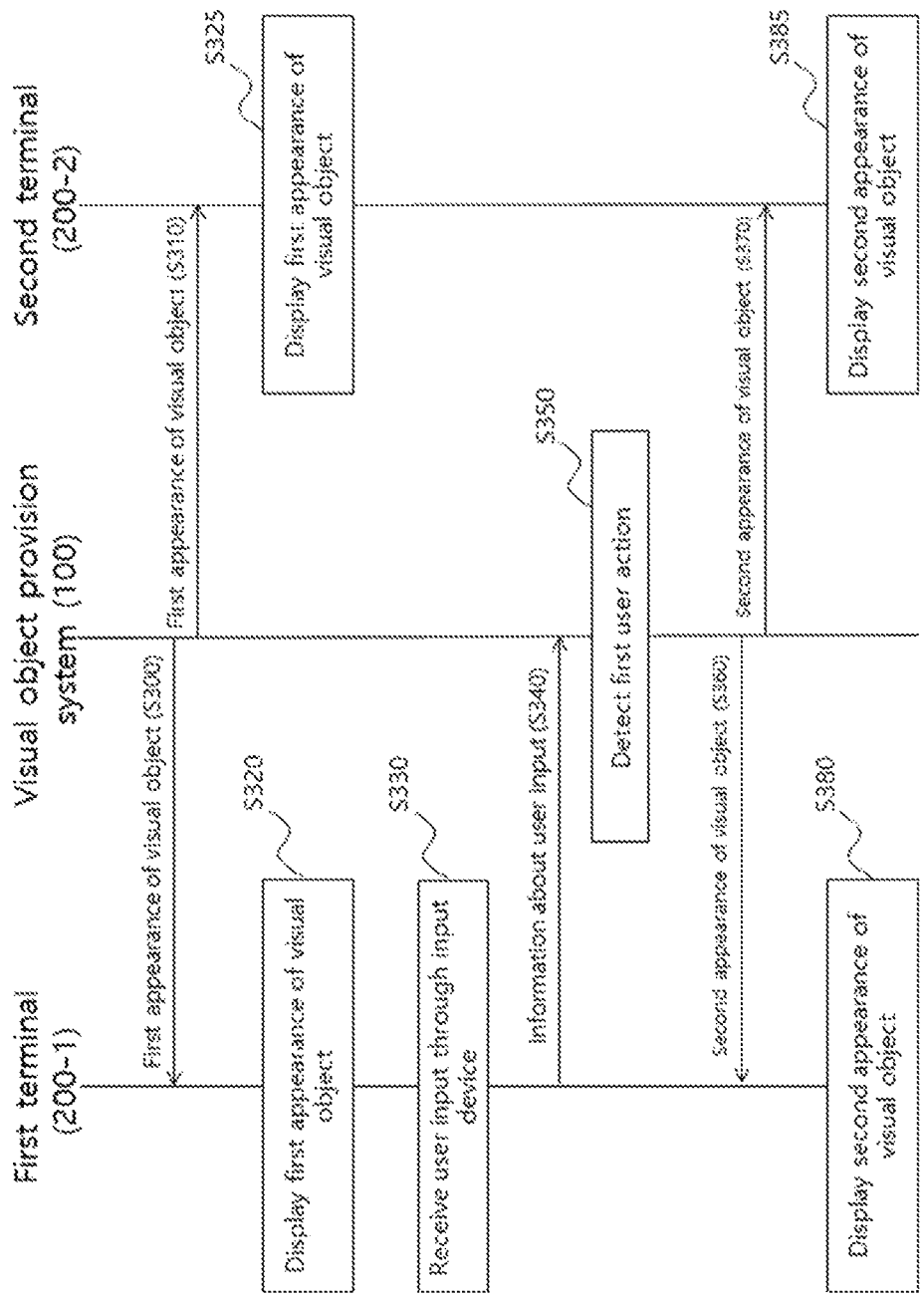

FIG. 10 is a flowchart illustrating a visual object provision method according to another exemplary embodiment of the invention.

Referring to FIG. 10, the visual object provision system 100 may provide the first appearance of a visual object to the first terminal 200-1 and the second terminal 200-2 (S300, S310).

In response thereto, the first terminal 200-1 and the second terminal 200-2 may display the first appearance of the visual object (S320, S325).

While the first appearance of the visual object is displayed or after it is displayed, the first terminal 200-1 may receive a user input through an input device (S330).

Furthermore, the first terminal 200-1 may transmit information about the received user input to the visual object provision system 100 (S340). In response thereto, the visual object provision system 100 may detect whether the user input received by the first terminal 200-1 through the input device is a previously designated first user action based on the information (S350).

For example, if the first user action is a user input that may be determined through contactless motion recognition, such as a smiling expression or an applauding expression, the first terminal 200-1 may transmit information of an image, captured by the camera module, to the visual object provision system 100. The visual object provision system 100 may analyze the received image information, may perform expression recognition, motion recognition or gesture recognition, and may detect whether the first user action has occurred based on the results of the execution.

When the first user action caused by the user of the first terminal 200-1 is detected, the visual object provision system 100 may provide the second appearance of the visual object to the first terminal 200-1 and the second terminal 200-2 (S360, S370).

In response thereto, the first terminal 200-1 and the second terminal 200-2 may display the second appearance of the visual object (S380, S385).

Figure 11:
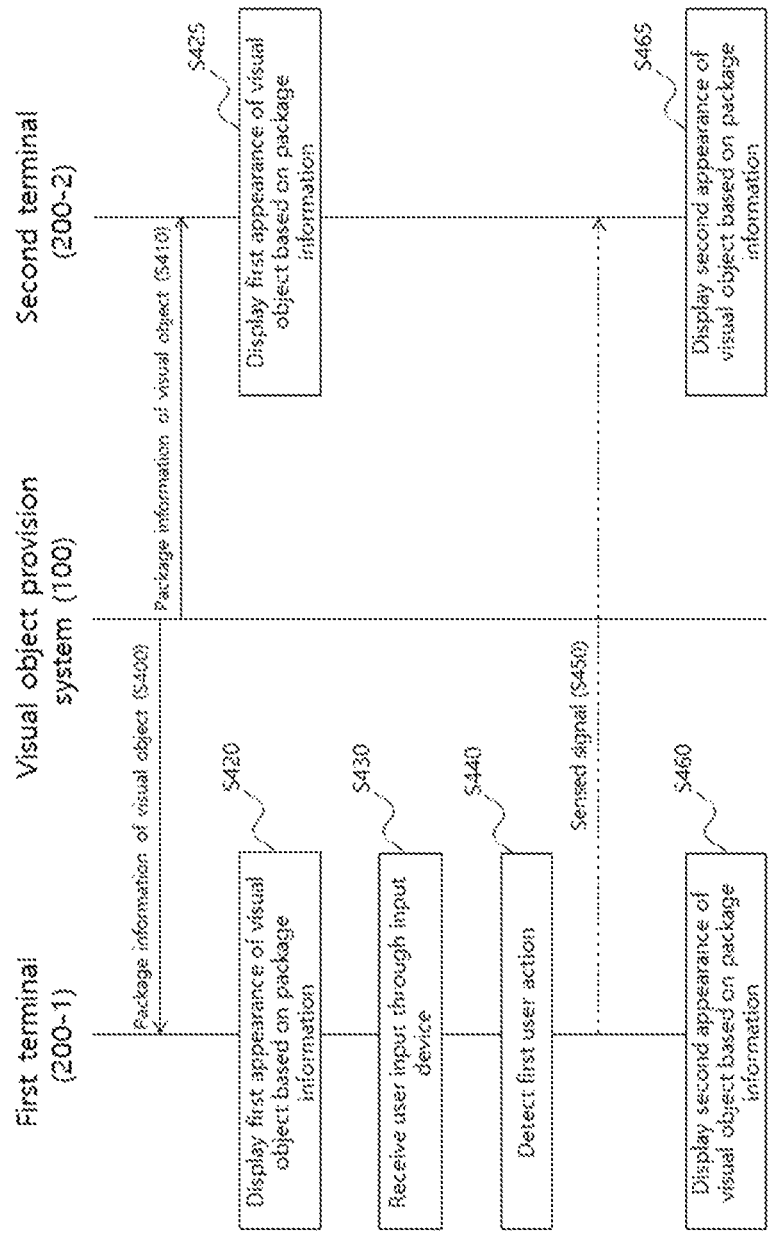

FIG. 11 is a flowchart illustrating a visual object provision method according to another exemplary embodiment of the invention.

Referring to FIG. 11, the visual object provision system 100 may provide package information of a visual object to the first terminal 200-1 and the second terminal 200-2 (S400, S410). The package information may include information about at least two appearances that may be taken by the visual object.

The first terminal 200-1 and the second terminal 200-2 may display the first appearance of the visual object based on the received package information (S420, S425).

While the first appearance of the visual object is displayed or after it is displayed, the first terminal 200-1 may receive a user input through an input device (S430). Furthermore, the first terminal 200-1 may detect whether the user input received through the input device is a previously designated first user action (S440).

When the first user action caused by the user of the first terminal 200-1 is detected, the first terminal 200-1 may transmit a given sensed signal to the second terminal 200-2 (S450). The first terminal 200-1 may directly transmit the sensed signal to the second terminal 200-2 or may transmit the sensed signal to the second terminal 200-2 through the visual object provision system 100. The sensed signal may be a signal that the first terminal 200-1 provides notification of the detection of the first user action or a signal that the first terminal 200-1 requests the display of the second appearance of the visual object.

In response to the detected first user action, the first terminal 200-1 may display the second appearance of the visual object based on the package information (S460).

In response to the received sensed signal, the second terminal 200-2 may display the second appearance of the visual object based on the package information (S465).

Figure 12:
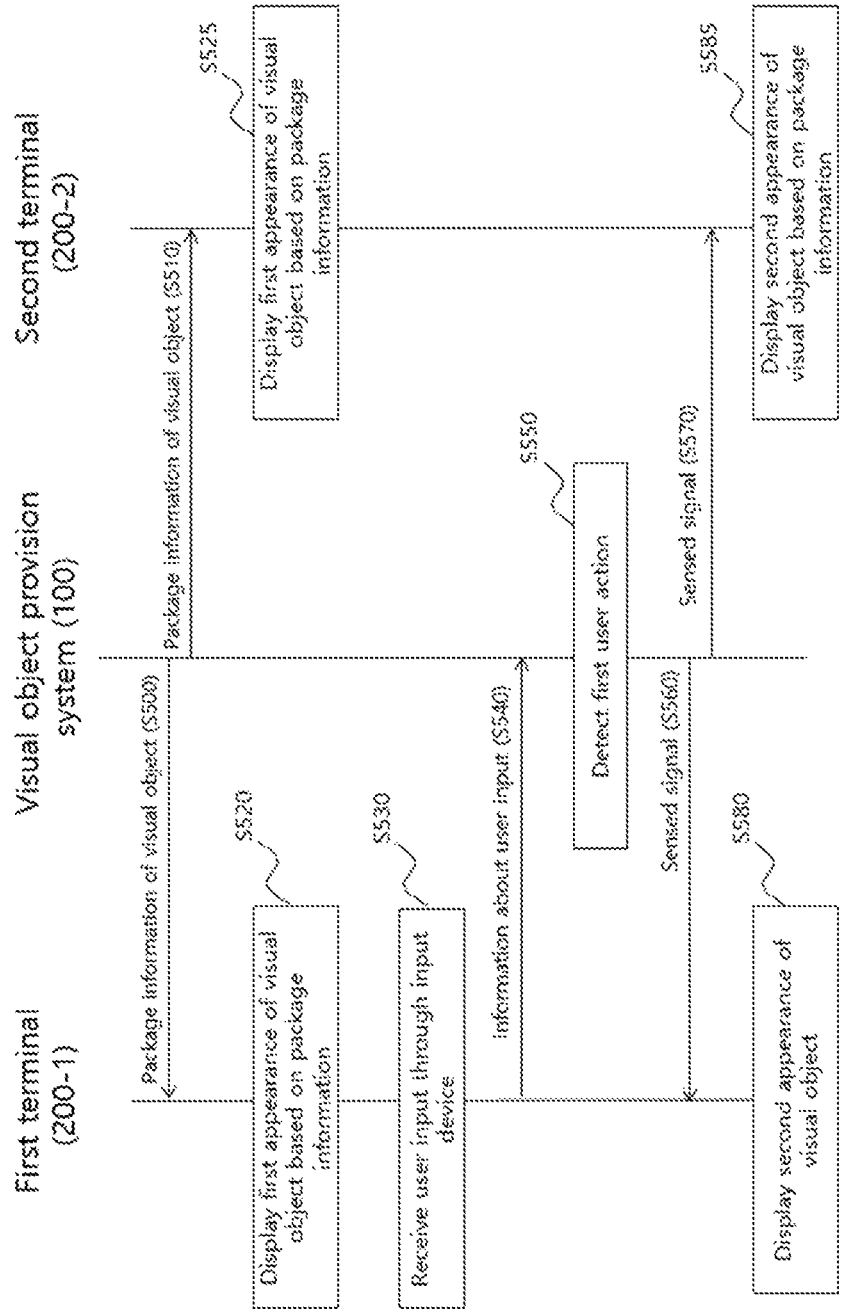

FIG. 12 is a flowchart illustrating a visual object provision method according to another exemplary embodiment of the invention.

Referring to FIG. 12, the visual object provision system 100 may provide package information of a visual object to the first terminal 200-1 and the second terminal 200-2 (S500, S510). The first terminal 200-1 and the second terminal 200-2 may display the first appearance of the visual object based on the received package information (S520, S525).

While the first appearance of the visual object is displayed or after it is displayed, the first terminal 200 may receive a user input through an input device (S530). Furthermore, the first terminal 200-1 may transmit information about the received user input to the visual object provision system 100 (S540). In response thereto, the visual object provision system 100 may detect whether the user input received by the first terminal 200-1 through the input device is a previously designated first user action based on the information (S550).

When the first user action caused by the user of the first terminal 200-1 is detected, the visual object provision system 100 may transmit a given sensed signal to the first terminal 200-1 and the second terminal 200-2 (S560, S570). The sensed signal may be a signal for providing notification of the detection of the first user action or a signal for requesting the display of the second appearance of the visual object.

In response to the received sensed signal, the first terminal 200-1 and the second terminal 200-2 may display the second appearance of the visual object based on the package information (S580, S585).

In some exemplary embodiments, the visual object provision system 100 may include a processor and memory for storing a program executed by the processor. In this case, when the program is executed by the processor, it may enable the visual object provision system 100 according to the present exemplary embodiment to execute the above-described visual object provision method.

The visual object provision method according to an exemplary embodiment of the invention may be implemented as computer-readable program instructions and stored in a computer-readable recording medium. A control program and target program according to embodiments of the present invention may also be stored in a computer-readable recording medium. The computer-readable recording medium includes all types of recording devices in which data readable by a computer system is stored.

Program instructions recorded on the recording medium may have been specially designed or configured for the present invention or may have been known to and available by a person skilled in the software field.

Examples of the computer-readable recording medium include hardware devices specially configured to store and execute program instructions, such as magnetic media such as a hard disk, a floppy disk and a magnetic disk, optical media such as CD-ROM and a DVD, magneto-optical media such as a floptical disk, ROM, RAM, and flash memory. Furthermore, the computer-readable medium may be distributed to computer systems connected over a network, and computer-readable code may be stored and executed in a distributed manner.

An example of the program instructions includes a high-level language code executable by a device for electronically processing information using an interpreter, for example, a computer, in addition to a machine code, such as that produced by a compiler.

The above-described hardware device may be configured to operate as one or more software modules in order to perform an operation of the invention and vice versa.

If the visual object provision method according to an exemplary embodiment of the present invention is applied to various chatting/call services (e.g., a video call, video chatting, voice chatting and text chatting), it can perform a function as an icebreaker that obviates tension or awkwardness and makes it easier to provide a chatting atmosphere.

Furthermore, there is an effect in that two users who talk with each other through a chatting/call service may have a high sense of intimacy or induce a counterpart's interest and induce a fun atmosphere.

The aforementioned description is illustrative, and those skilled in the art to which the present invention pertains will appreciate that the present invention may be implemented in other detailed forms without departing from the technical spirit or essential characteristics of the present invention. Accordingly, the aforementioned embodiments should be construed as being only illustrative not as being restrictive from all aspects. For example, each of the elements described in the singular forms may be distributed and implemented. Likewise, elements described in a distributed way may also be combined and implemented.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of providing an interactable visual object, comprising:
   establishing, by a first terminal and a second terminal, a video call session;
   displaying, by the first terminal, a first video photographed by the second terminal and provided to the first terminal;
   displaying, by the second terminal, a second video photographed by the first terminal and provided to the second terminal;
   displaying, by the first terminal, a first appearance of an interactable visual object by overlaying the first appearance on the first video;
   displaying, by the second terminal, the first appearance of the visual object by overlaying the first appearance on the second video;
   displaying, by the first terminal, a second appearance of the visual object different from the first appearance of the visual object by overlaying the second appearance on the first video when a first user action caused by a user of the first terminal or a user of the second terminal is detected while the first appearance of the visual object is displayed or after the first appearance is displayed; and displaying, by the second terminal, the second appearance of the visual object by overlaying the second appearance on the second video when the first user action caused by the user of the first terminal or the user of the second terminal is detected, wherein:

the first and second appearances of the visual object are separate and distinct from each other and occur at different times;

the second appearance of the visual object is any one of predefined two or more different selectable appearances;

the first user action is any one of previously designated two or more different user actions; and each of the two or more user actions corresponds to any one of the two or more different selectable appearances.

2. The method of claim 1, wherein the second appearance of the visual object displayed by the first terminal and the second terminal when the first user action caused by the user of the first terminal is detected and the second appearance of the visual object displayed by the first terminal and the second terminal when the first user action caused by the user of the second terminal is detected are identical.

3. The method of claim 1, wherein:

the step of displaying, by the first terminal, a second appearance of the visual object different from the first appearance of the visual object by overlaying the second appearance on the first video comprises a step of displaying, by the first terminal, a selectable appearance corresponding to the first user action by overlaying the selectable appearance on the first video; and the step of displaying, by the second terminal, the second appearance of the visual object by overlaying the second appearance on the second video comprises a step of displaying, by the second terminal, the selectable appearance corresponding to the first user action by overlaying the selectable appearance on the second video.

4. The method of claim 1, further comprising:

when a second user action caused by the user of the second terminal is detected while the second appearance of the visual object is displayed or after the second appearance is displayed, displaying, by the second terminal, a third appearance of the visual object different from the second appearance of the visual object by overlaying the third appearance on the second video; and displaying, by the first terminal, the third appearance of the visual object by overlaying the third appearance on the first video.

5. The method of claim 1, further comprising sensing, by the first terminal, the first user action based on a user input received through an input interface or transmitting information about the user input received through the input interface to a given external system, wherein the external system detects the first user action based on the information about the received user input.

6. The method of claim 5, wherein the input interface comprises at least one of a touch sensor receiving a touch input, a microphone receiving a sound input, a sensor measuring motion information of the first terminal, and a camera module capturing an image.

7. The method of claim 1, further comprising:

performing, by the first terminal, expression recognition or motion recognition by analyzing an image photographed by the first terminal comprising a camera module; and detecting, by the first terminal, the first user action based on a result of the executed expression recognition or motion recognition.

8. The method of claim 1, further comprising:

transmitting, by the first terminal, an image photographed by the first terminal comprising a camera module to a given external system;

performing, by the external system, expression recognition or motion recognition by analyzing the image photographed by the first terminal; and detecting, by the external system, the first user action based on a result of the executed expression recognition or motion recognition.

9. A method of providing an interactable visual object, comprising:

selecting, by a visual object provision system, any one of a plurality of interactable visual objects;

providing, by the visual object provision system, a first appearance of the selected visual object to a first terminal and a second terminal performing a video call with the first terminal; and providing, by the visual object provision system, a second appearance of the visual object different from the first appearance of the visual object to the first terminal and the second terminal when a first user action caused by a user of the first terminal or a user of the second terminal is detected while the first appearance of the visual object is displayed or after the first appearance is displayed, wherein:

the first and second appearances of the visual object are separate and distinct from each other and occur at different times;

the second appearance of the visual object is any one of predefined two or more different selectable appearances;

the first user action is any one of previously designated two or more different user actions; and each of the two or more user actions corresponds to any one of the two or more different selectable appearances.

10. A method of providing an interactable visual object, comprising:

selecting, by a visual object provision system, any one of a plurality of interactable visual objects; and providing, by the visual object provision system, package information corresponding to the selected visual object to a first terminal and a second terminal performing a video call with the first terminal, wherein:

the package information comprises information about a first appearance of the visual object and information about a second appearance of the visual object different from the first appearance of the visual object;

the first terminal displays a first video photographed by the second terminal and provided to the first terminal and displays the first appearance of the visual object based on the provided package information by overlaying the first appearance on the first video;

the second terminal displays a second video photographed by the first terminal and provided to the second terminal and displays the first appearance of the visual object based on the provided package information by overlaying the first appearance on the second video;

when a first user action caused by a user of the first terminal or a user of the second terminal is detected while the first appearance of the visual object is displayed or after the first appearance is displayed, the first terminal displays the second appearance of the visual object based on the provided package information by overlaying the second appearance on the first video;

the second terminal displays the second appearance of the visual object based on the provided package information by overlaying the second appearance on the second video;

the first and second appearances of the visual object are separate and distinct from each other and occur at different times;

the second appearance of the visual object is any one of predefined two or more different selectable appearances;

the first user action is any one of previously designated two or more different user actions; and each of the two or more user actions corresponds to any one of the two or more different selectable appearances.

11. The method of claim 9, wherein the step of selecting, by a visual object provision system, any one of a plurality of interactable visual objects, comprises a step of selecting, by the visual object provision system, the visual object based on at least one of information of a first user corresponding to the first terminal and comprising at least one of date of birth, an age, sex, nationality, an address, an access place, and an area of interest, information of a second user corresponding to the second terminal as a result of analysis of an image photographed the first terminal and comprising at least one of date of birth, an age, sex, nationality, an address, an access place, and an area of interest, and a time when a determination is made as a result of analysis of an image photographed by the second terminal.

12. A computer-readable recording medium in which a computer program for performing a method according to claim 1 is stored.

13. A visual object provision system, comprising:
a processor; and
a memory storing a computer program,
wherein the computer program enables the visual object provision system to perform a method according to claim 9 when the computer program is executed by the processor.

14. The method of claim 10, wherein the step of selecting, by a visual object provision system, any one of a plurality of interactable visual objects, comprises a step of selecting, by the visual object provision system, the visual object based on at least one of information of a first user corresponding to the first terminal and comprising at least one of date of birth, an age, sex, nationality, an address, an access place, and an area of interest, information of a second user corresponding to the second terminal as a result of analysis of an image photographed the first terminal and comprising at least one of date of birth, an age, sex, nationality, an address, an access place, and an area of interest, and a time when a determination is made as a result of analysis of an image photographed by the second terminal.

15. A computer-readable recording medium in which a computer program for performing a method according to claim 9 is stored.

16. A computer-readable recording medium in which a computer program for performing a method according to claim 10 is stored.

17. A visual object provision system, comprising:
a processor; and
a memory storing a computer program,
wherein the computer program enables the visual object provision system to perform a method according to claim 10 when the computer program is executed by the processor.

* * * * *